US009438649B2

(12) United States Patent
Tallett

(10) Patent No.: US 9,438,649 B2
(45) Date of Patent: Sep. 6, 2016

(54) WARPED PRESENTATION OF EVENTS IN CALENDAR VIEWS

(71) Applicant: Microsoft Corporation, Redmond, WA (US)

(72) Inventor: Paul R. Tallett, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 14/220,386

(22) Filed: Mar. 20, 2014

(65) Prior Publication Data

US 2015/0268839 A1 Sep. 24, 2015

(51) Int. Cl.
*G06Q 10/10* (2012.01)
*H04L 29/06* (2006.01)

(52) U.S. Cl.
CPC ........... *H04L 65/403* (2013.01); *G06Q 10/109* (2013.01)

(58) Field of Classification Search
CPC .................................................... G06Q 10/109
USPC .......................................................... 715/745
See application file for complete search history.

(56) References Cited

U.S. PATENT DOCUMENTS 5,845,257 A * 12/1998 Fu ........................ G06F 15/0266 368/21
7,305,491 B2 * 12/2007 Miller .................... G09B 19/18 368/185
7,689,448 B2 * 3/2010 Fu ....................... G06F 15/0266 368/21
8,295,126 B2 * 10/2012 Wood ................... G04G 9/0076 368/21
8,607,250 B2 * 12/2013 Oral ..................... G06Q 10/109 705/7.13
2003/0088427 A1 * 5/2003 Elsey ................... G06Q 10/109 705/346
2006/0136121 A1 * 6/2006 Eisen ................... G06Q 10/109 701/532
2007/0150502 A1 * 6/2007 Bloebaum ......... G06F 17/30861
2007/0186193 A1 * 8/2007 Curran ................. G06Q 10/109 715/780
2009/0168609 A1 * 7/2009 Weir .................... G06Q 10/109 368/21
2010/0075648 A1 * 3/2010 Matsuoka ......... H04M 1/72566 455/418
2010/0175001 A1 * 7/2010 Lazarus ............... G06Q 10/109 715/753
2012/0233563 A1 * 9/2012 Chakra ............ G06Q 10/06312 715/772
2015/0199077 A1 * 7/2015 Zuger .................. G06Q 10/109 715/764
2015/0268839 A1 * 9/2015 Tallett .................. G06Q 10/109 715/745
2015/0294273 A1 * 10/2015 Barraci .............. G06Q 10/1093 705/7.18
2016/0104119 A1 * 4/2016 Von Hessberg ..... G06Q 10/109 455/456.3

OTHER PUBLICATIONS

Masoodian, et al., "A Comparison of Linear and Calendar Travel Itinerary Visualizations for Personal Digital Assistants", In Proceedings of OZCHI, the CHISIG Annual Conference on Human-Computer Interaction, Nov. 20, 2004, 12 pages.

* cited by examiner

*Primary Examiner* — Reza Nabi
(74) *Attorney, Agent, or Firm* — Damon Rieth; Christopher Coy; Micky Minhas

(57) ABSTRACT

Disclosed herein are systems, methods, and software for providing warped event presentations in calendars. A calendar is set to an active time zone and a period of time is identified within which to display a warped presentation of events scheduled to occur outside of the active time zone. For at least an event scheduled to occur outside of the active time zone at a time in a different time zone that falls within the period of time, the event is presented in the calendar as if the event were scheduled for that time, but in the active time zone.

6 Claims, 6 Drawing Sheets

EVENT INTERFACE  501

| Flight | 503 |
| From: DEN  To: SEA | 505 |
| Depart: Wed, 3/5 @ 9:00am | 507 |
| Return: Thur, 3/6 @ 10:00am | 509 |

| MST | MON | TUE | WED | THU | FRI |
|---|---|---|---|---|---|
| 9:00A | 601 | | ▦ | ▦ | |
| 10:00A | | | ▦ | | |
| 11:00A | | | ▦ | | |
| 12:00P | | | ▦ | | |
| 1:00P | | | | | |

600 ◢
605 — (TUE column)
603 — (MST column)
607 — (WED column)

WARPED PRESENTATION OF EVENTS IN CALENDAR VIEWS

TECHNICAL FIELD

Aspects of the disclosure are related to computing hardware and software technology, and in particular, to the presentation of events in calendars.

TECHNICAL BACKGROUND

Calendaring software provides users with electronic versions of their calendars, from which events may be scheduled, appointments reviewed, and the like. Calendaring software may be implemented as stand-alone applications, as features of application packages that offer additional functionality, within the context of browser applications, as streamed or hosted services, as a combination thereof, or in any other manner. Examples include, but are not limited to, Microsoft® Outlook®, Microsoft® Exchange, and Google® Calendar, Most calendaring solutions accommodate scheduling in multiple time zones. In a typical example, a meeting organizer may invite others to an event who reside in other time zones. When the other users view the event via their calendaring software, the meeting will be presented in accordance with their active time zones, or the time zone to which their calendaring software is set. In this manner the other users may organize their schedules based on their active time zone, which usually is the time zone in which they reside.

Such mechanisms may help keep one's calendar organized to a certain extent, but other challenges remain, such as how to clearly present events in other time zones that a user is scheduled to attend in-person. For example, a user may plan a trip to a location in a different time zone, during which various events are scheduled. When viewing the trip within the context of their active time zone, the time for the events will be translated to their corresponding time in the active time zone. A meeting scheduled for 9:00 AM in one time zone, for instance, may be presented in a user's calendar as occurring at 11:00 AM.

Various tools have been developed to alleviate such inconveniences. One tool allows a user to dynamically toggle between time zones with ease. The user may be viewing their calendar in the context of their active time zone one instant, and then switch to a view of their calendar in the time zone of their destination.

Another tool presents a dual-view of a calendar in which a user's schedule is presented in multiple time zones. One view may present a user's schedule in his active time zone, while another view may present the user's schedule in another time zone, such as a destination time zone of interest.

Overview

Provided herein are systems, methods, and software for warping the presentation of events in calendars such that events may be viewed as they will be experienced, thereby enhancing the ability to schedule events in other time zones.

In at least one implementation, a calendar is set to an active time zone and a period of time is identified within which to display a warped presentation of events scheduled to occur outside of the active time zone. For at least an event scheduled to occur outside of the active time zone at a time in a different time zone that falls within the period of time, the event is presented in the calendar as if the event were scheduled for that time, but in the active time zone. For example, a non-warped event may be scheduled to occur on a day and at a time in the active time zone, while a warping event may be scheduled to occur on a different day and at that time, but in a different time zone. The non-warped event may be rendered to correspond to a representation of the time in a range of times. The warping event may also be rendered to correspond to the same representation of the time.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 2:
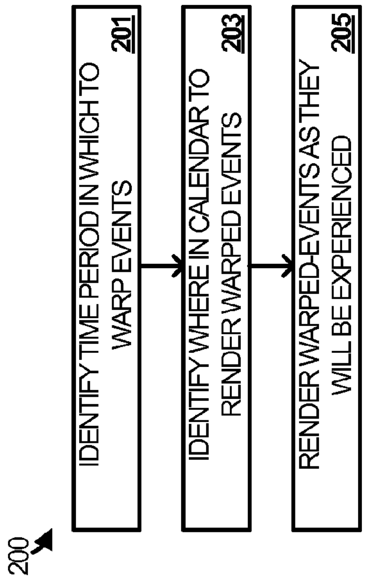
FIG. 2 illustrates a warping process in an implementation.

Implementations disclosed herein enable the presentation of events in a calendar to be warped such that the events appear as they will be experienced in a different time zone, other than the active time zone in which they are being viewed. In this manner, a user may review and schedule events with greater ease.

In at least one implementation, a period of time is identified within which to display a warped presentation of events scheduled to occur outside of an active time zone for a calendar. The period of time may be associated with travel outside of the active time zone, such as when a user plans a trip to a destination in a time zone removed from their local time zone. While the period of time may be defined by the start and end times of such travel, the period of time may also correspond to a meeting, conference, or other situation occurring outside of a user's active time zone. Other examples of the period of time are possible and may be considered within the scope of the present disclosure.

For at least an event that is scheduled to occur at a time in a different time zone (and thus outside of the active time zone) that falls within the period of time, the event is presented in a calendar as if the event was scheduled for that time, but in the active time zone. As user may thus be able to view events in her calendar as they will be experienced.

In some scenarios, a non-warped event may be scheduled to occur on a day and at a time in the active time zone, while a warping event may be scheduled to occur on a different day and at that time, but in a different time zone. The non-warped event may be rendered to correspond to a representation of the time in a range of times. The warping event may also be rendered to correspond to the same representation of the time.

In a brief example, an event may be scheduled to occur at 9:00 AM in a time zone other than a user's active time zone, or the time zone to which a calendar is set. Without warping, the event would be presented in the calendar such that it corresponds to a time offset from 9:00 AM to some degree, depending upon how many hours apart the time zone of the event is relative to the active time zone. With warping, the event is presented in the calendar such that it corresponds to 9:00 AM, with no offset at all, so that the user may view a period of time within which the event falls, as it will be experienced. In a case where another event is scheduled for 9:00 AM in the active time zone, either on the same day or a different day relative to the warped event, the presentation of the two events will appear as if they are to occur at the same time, even though they will actually occur at different times.

In some implementations, the period of time is identified by identifying a warping event and then identifying a start time and an end time for the warping event. Examples of warping events include travel, trips, meetings, conferences, and other types of situations that may involve users attending events outside of their active time zone.

A warp option may be presented in some scenarios when travel is being scheduled. The warp option may be selectable to either enable or disable the warped presentation of events scheduled to occur outside of the active time zone. The warp option may also be presented when a meeting or other more granular event is being scheduled.

In some implementations a calendar includes a warped region associated with the warped presentation of the events scheduled to occur outside of the active time zone. The calendar may also include a non-warped region associated with a non-warped presentation of non-warped events scheduled to occur in the active time zone. A visual characteristic may distinguish the presentation of the warped region from the non-warped region, such as a color coding of the warped region, a fill pattern, a font style, a shading pattern, or some other visual characteristic that indicates that a region in a calendar is warped.

Calendar warping may be employed with respect to weekly grids defined by days and a single range of time associated with an active time zone. In such situations, each individual representation of time in a single range of times may apply across the multiple days in the weekly grid. Other implementations may involve monthly grids in which each segment in the grid is representative of a day in a month. Warped events may be presented in association with a time for the events given in terms of a time zone in which the events will be experienced, rather than an active time zone for the calendar. Other views are possible in addition to weekly and monthly views, such as daily views, partial week views, and the like.

Figure 3:
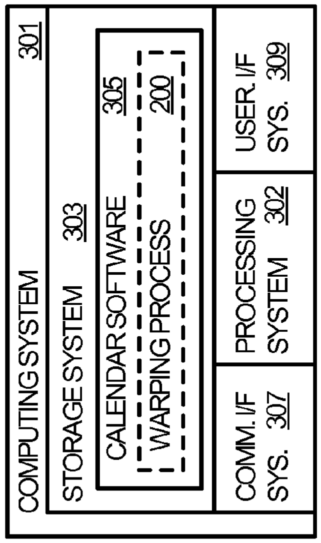
FIG. 3 illustrates a computing system in an implementation.
Figure 1:
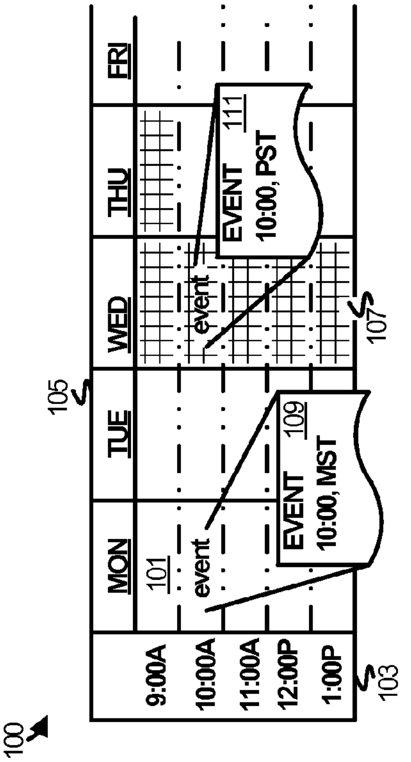
FIG. 1 illustrates a calendar view in an implementation.
Figure 4A:
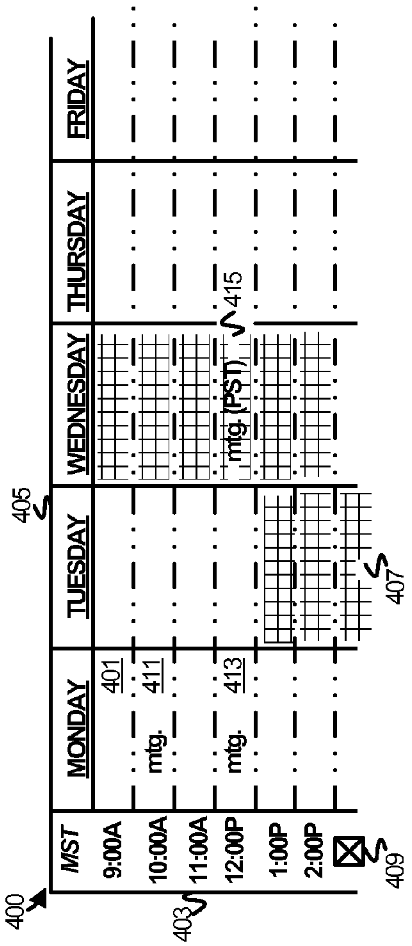
FIGS. 4A-4B illustrate a calendar view in an implementation.
Figure 4B:
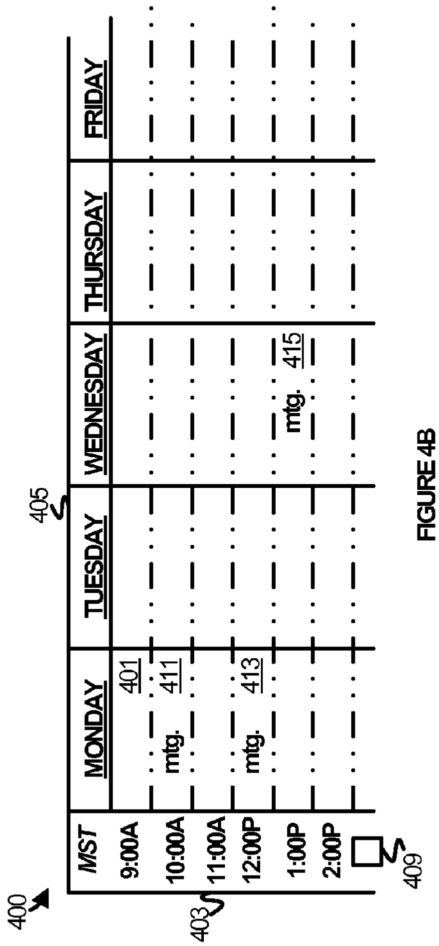
Figure 5:
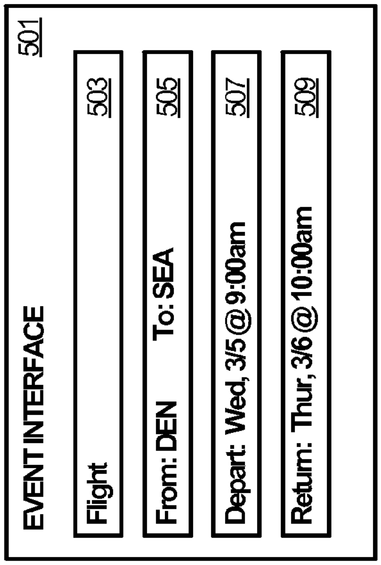
FIG. 5 illustrates an event interface in an implementation.
Figure 6:
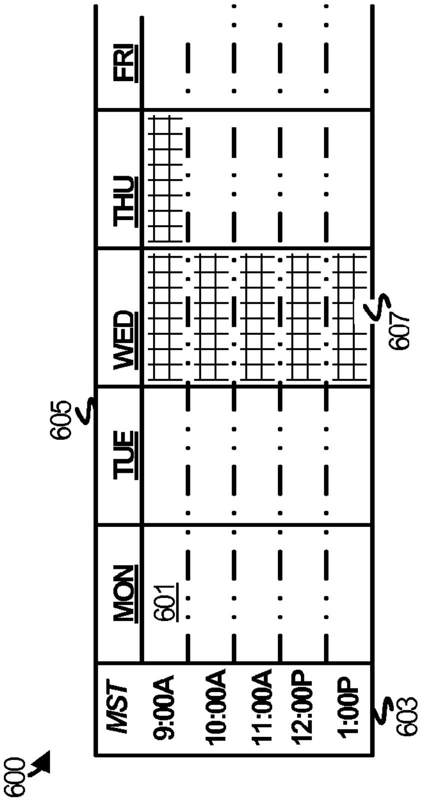
FIG. 6 illustrates a calendar view in an implementation.
Figure 7:
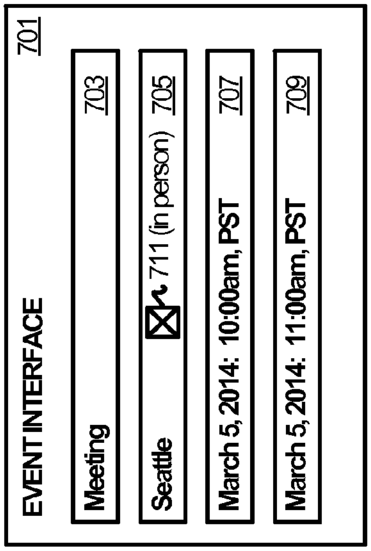
FIG. 7 illustrates an event interface in an implementation.
Figure 8:
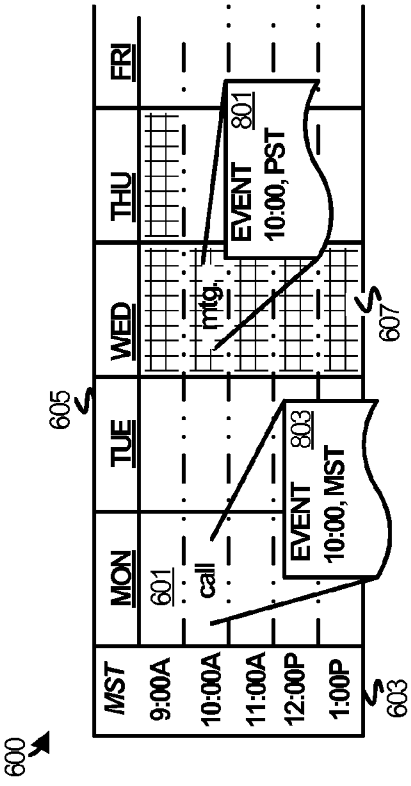
FIG. 8 illustrates a calendar view in an implementation.
Figure 9:
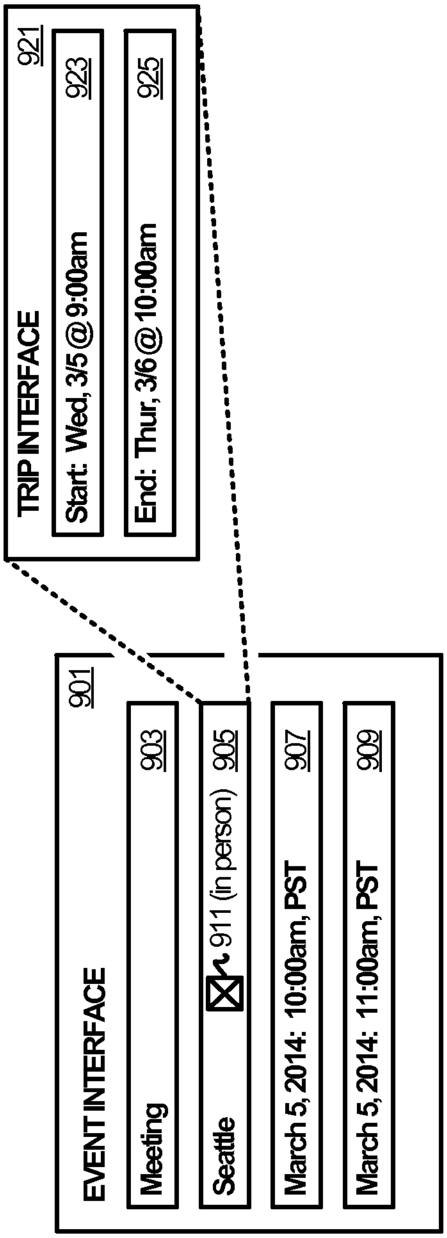
FIG. 9 illustrates an event interface and a trip interface in an implementation.
Figure 10:
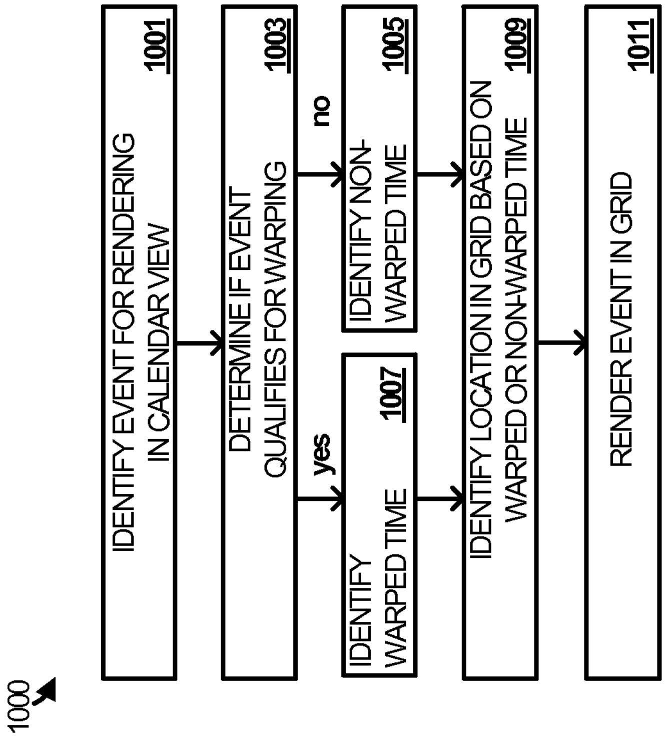
FIG. 10 illustrates another warping process in an implementation.

Referring now to the drawings, FIG. 1 illustrates a calendar view to which a warping process, illustrated in FIG. 2, may be applied. FIG. 3 illustrates a computing system suitable for employing such a warping process. FIGS. 4A-4B illustrate another calendar view in an operational scenario. FIG. 5 illustrates an event interface for scheduling events while FIG. 6 illustrates a calendar view with a period of time defined in which events may be warped. FIG. 7 illustrates another event interface and FIG. 8 illustrates another calendar view. FIG. 9 illustrates an event interface and a trip interface in an implementation. FIG. 10 illustrates another warping process in an implementation.

Turning to FIG. 1, calendar view 100 includes a schedulable block 101 representative of blocks of time that may be scheduled. The blocks of time are defined in terms of a range of times 103 and a range of days 105. While calendar view 100 provides a weekly view of a calendar, it may be appreciated that a daily, bi-weekly, or monthly view are also possible, as well as any other calendar format.

In calendar view 100, a period of time 107 has been identified within which the presentation of events may be warped. The period of time 107 in this implementation extends from 9:00 AM on Wednesday morning to approximately 10:00 AM on Thursday morning. During that period of time 107, events that are scheduled to occur outside of an active time zone set for calendar view 100 may be warped such that a user views the events as they will be experienced.

As an example, calendar view 100 includes event 109 and event 111. Event 109 is representative of an event that is scheduled outside of the period of time 107, and in particular for 10:00 AM, Mountain Standard Time (MST) on Monday. By way of differentiation, event 111 is representative of an event that is scheduled to occur within period of time 107 for 10:00 Pacific Standard Time (PST) on Wednesday.

However, the presentation of event 111 is warped such that it is rendered in calendar view 100 to correspond to a representation of the time "10:00 AM" in the range of times 103 that define the blocks of time. The presentation may be considered warped because event 109 is also rendered to correspond to the same representation of the time "10:00 AM," even though event 111 and event 109 will not actually occur at the same time on different days. If the presentation of event 111 was to not be warped, then event 111 would be presented in the block of time corresponding to 11:00 AM-MST, on Wednesday.

The period of time 107 that is identified for warped presentation may be distinguished from other portions of calendar view 100 by some visual characteristic, which in this case is represented by a different fill pattern relative to other parts of calendar view 100. Font style or color, shading, border formats, or other characteristics may also be used.

In FIG. 1, event 111 is representative of an event that is scheduled to occur at 10:00 AM-PST. Event 111 may be, for example, a meeting that a user associated with calendar view 100 is scheduled to attend in-person. Thus, the person will be physically present in the associated time zone for a given amount of time. Period of time 107 may therefore be representative of a duration of travel for the user.

However, in some scenarios event 111 may be representative of an online meeting, conference call, or some other event that is not specific to a particular time zone, but that coincides with a period of travel by a user. In both cases the end result is the same-the presentation of event 111 can be warped in calendar view 100 such that it is presented in association with a time in range of times 103 that represents how it will be experienced during the period of time 107 that the user is outside of the active time zone. Whether the user is going to attend an in-person meeting while outside of the active time zone or participate in an online meeting or call while physically outside of the active time zone, the upcoming event can be presented in calendar view 100 as it is going to be experienced by the user when he or she is outside of the active time zone.

FIG. 2 illustrates a warping process 200 that may be employed by a suitable computing system to implement calendar view 100 and its associated operations discussed above, of which computing system 301 is representative.

In operation, computing system identifies a time period in which to warp the presentation of events (step 201). This may involve, for example, identifying the start and end times associated with a trip or other such event that takes a user to a different time zone other than the active time zone to which a calendar is set.

Upon identifying the time period, computing system 301 identifies where in a calendar to render a warped event or events (step 203). The position in a calendar where a warped event is rendered will generally correspond to a representation of a time for the warped event in terms of an active time zone for the calendar. In a weekly view of a calendar, identifying where to render a warped event may include identifying a position in a grid that corresponds to a warped time for the event. In a daily view of a calendar, identifying where to render a warped event may include identifying a position in a list or array that corresponds to a warped time for an event.

Each event is then rendered in a calendar view such that the events are presented as they will be experienced in a given time zone, rather than translating or adjusting the time of an event for an active time zone (step 205). In this manner, a user viewing a period of time in the future can schedule and review appointments with ease.

FIG. 3 illustrates computing system 301 which is representative of one or more computing systems or devices that may be used to implement warping process 200 or warping process 1000 (illustrated in FIG. 10). Warping process 200 or warping process 1000 may be implemented in the context of calendar software that runs locally, such as calendar applications, personal information management applications, or any other type of software. Such software may be deployed as a locally installed and executed applications, as software executed within the context of a browser application, as a mobile application, as a streaming or streamed application, or in any other manner. Warping process 200 or warping process 1000 may also be implemented in the context of server-side software that is hosted remotely from a client application and serves calendar views to client-side software.

Examples of computing system 301 that may employ warping process 200 or warping process 1000 in the context of calendar software include, but are not limited to, smart phones, laptop computers, tablet computers, desktop computers, hybrid computers, gaming machines, virtual machines, televisions, watches and other wearable devices, as well as any variation or combination thereof. Other examples of computing system 301 that may employ warping process 200 or warping process 1000 in the context of calendar software include, but are not limited to, server computers, rack servers, web servers, cloud computing platforms, and data center equipment, as well as any other type of physical or virtual server machine, and any variation or combination thereof FIG. 4A and FIG. 4B illustrate another calendar view 400 in an implementation to demonstrate a scenario in which warping can be selectively enabled and disabled. In FIG. 4A warping is enabled, while in FIG. 4B warping is disabled.

Calendar view 400 is representative of any calendar view that may be rendered by a computing system executing calendar software, of which computing system 301 is representative. Calendar view 400 includes blocks of schedulable time, of which block 401 is representative. The blocks of time are defined in a grid by a range of times 403 and a range of days 405. A period of time 407 within which to warp events is presented in calendar view 400, along with a warp option 409 that is selectable to enable warping for the period of time 407 or disable warping for the period of time 407.

In FIG. 4A, warping option 409 is selected. As such, events in the period of time 407 are warped. As an example, two events are scheduled on Monday, which falls outside of the period of time 407 identified for warping. Event 411 is a meeting scheduled for 10:00 AM-MST, while event 413 is a meeting scheduled for 12:00 PM-MST. Event 411 is located in the grid such that it corresponds to a representation of its scheduled time in the range of times 403. Event 413 is also located in the grid such that it corresponds to a representation of its scheduled time in the range of times 403.

Event 415 is another meeting, but it falls within the period of time 407 identified for warping. The period of time 407 extends from 1:00 pm on Tuesday to 3:00 pm on Wednesday. Events scheduled within that period of time may be "warped" in calendar view 400. Accordingly, event 415 is located in the grid to correspond to a representation of time in the range of times 403 that expresses how event 415 will be experienced in the time zone in which it is scheduled to occur. In this example, event 415 is scheduled to occur in the Pacific time zone at 12:00 pm, and thus it is positioned to correspond to 12:00 pm in the range of times 403.

However, it may be appreciated that event 415 is scheduled to occur outside of the active time zone for calendar view 400, which is the Mountain time zone. Thus, if warping were not employed, then event 415 would be rendered to correspond to 1:00 PM in the range of times 403 because the Mountain time zone is one hour head (or offset) from the Pacific time zone. FIG. 4B illustrates such a scenario where warp option 409 is de-selected, or not selected. Accordingly, events are not warped in FIG. 4B. Rather, event 415 is positioned to correspond to 1:00 PM in the range of times, which is the time at which event 415 is scheduled to occur in the context of the Mountain time zone. It may also be appreciated that, because warping is disabled, there are no periods of time displayed for which warping is enabled. A user could toggle back and forth between the enabled and disabled states by selecting and unselecting warp option 409.

FIG. 5 illustrates an event interface 501 through which a user may schedule an event that triggers a period of time to be identified for time warping. Event interface 501 includes various elements that allow a user to input information about an event, including an event type 503, a location 505, a start time 507, and an end time 509. In this example, a flight is scheduled that departs from Denver and arrives Seattle. The flight departs on Wednesday, March 5, at 9:00 AM-MST. The return flight is scheduled to arrive on Thursday, March 6, at 10:00 AM-MST.

Because the destination is Seattle, which is in the Pacific time zone, a computing system implementing warping process 200 or other associated operations would know that a user will be in the Pacific time zone for the duration of the trip. Thus, events scheduled within that time period may be rendered in a calendar view as they will be experienced in the Pacific time zone, rather than as they will occur in the Mountain time zone or some other active time zone for a calendar.

Accordingly, FIG. 6 illustrates calendar view 600 includes a period of time 607 that is representative of the period of time that would result from the exemplary trip scheduled in event interface 501. Calendar view 600 includes blocks 601 in a grid defined by a range of times 603 and days 605 within which the period of time 607 is presented. Period of time 607 is set apart visually from other regions of calendar view 600 by its fill pattern, which is representative of how the period of time may be visually distinguished.

Continuing with calendar view 600 as an exemplary view, FIG. 7 illustrates another event interface 701 that may be used to schedule an event that occurs during period of time 607. Event interface 701 includes various elements for inputting information about an event, such as event type 703, location 705, start time 707, and end time 709. Event interface 701 also includes an option 711 selectable to indicate whether or not a user will attend the event in-person. In this case, the event is a meeting taking place in Seattle from 10:00 AM-PST to 11:00 AM-PST, and the user will attend in-person.

FIG. 8 illustrates a resulting view of the event scheduled in event interface 701 within the context of a warped presentation. In particular, calendar view 600 now includes event 801 rendered within the period of time 607 identified for warped presentation. Another event 803 is illustrated in FIG. 8 to clarify the differences between events that are presented in a warped fashion and those that are not.

For example, event 803, which is a conference call scheduled to occur at 10:00-MST, is rendered in a location in calendar view 600 that corresponds to a representation of "10:00 AM" in the range of times 603. In contrast, event 801 is rendered in a different manner in that, while it is scheduled to occur at 11:00 AM-MST (by virtue of being scheduled for 10:00 AM-PST), it is rendered in calendar view 600 to also correspond to the representation of "10:00 AM" in the range of times 603. In other words, even though event 801 and event 803 are scheduled to occur at different times, they are rendered in calendar view 600 in the same vertical position and correspond to the same time in the range of times 603, although on different days.

While FIG. 5 illustrates a trip scheduled through event interface 501, and while FIG. 7 illustrates a meeting scheduled through event interface 701, it may be appreciated that such events may be created in other ways. For example, an invite or other data structure may be received into a calendar application or other such software that includes event information that is then used to populate a calendar view. Such invitations are generally well known and need not be discussed at length. It may also be possible to import trip information from other types of services, such as online booking services, emails delivered to an email application that include trip information, or in any other way. In other words, a user need not create a trip, meeting, or other such event in order for it to be considered by calendar software.

It may also be appreciated that the sequence implied by FIGS. 5-8 may vary. For instance, whereas a trip is scheduled in FIG. 5, followed by a meeting in FIG. 7, the reverse may also be true. A meeting may be scheduled first, and then at a later time a trip or other travel that triggers a warped presentation of events may be scheduled.

FIG. 9 illustrates one such alternative implementation in which a meeting is created and a trip is created from within the context of the meeting. In particular, event interface 901 includes various elements used to input information about an event, including meeting type 903, location element 905, start time 907, and end time 909. In this example, event interface 901 also includes a trip interface 921 for scheduling details of a trip. Trip interface 921 is a branch from location element 905 that may be dynamically rendered when option 911 is selected to indicate that the event being scheduled will be attended in person. Upon selecting option 911, trip interface 921 is displayed which allows a user to input information into the start time 923 and end time 925 elements of trip interface 921. The start and end times may then be used to identify a period of time within which the presentation of events will be warped. For example, a period of time resulting from the exemplary meeting illustrated in FIG. 9 would extend from Wednesday, March 5 at 9:00 AM to Thursday, March 6, at 10:00 AM. And, because the meeting scheduled in event interface 901 falls within that period of time, its presentation would be warped in a calendar view.

FIG. 10 illustrates another warping process 1000 that may be carried out by a suitable computing system implementing calendar software, of which computing system 301 is representative. In operation, an event is identified for rendering in a calendar view (step 1001). This may occur when, for example, a user navigates to a new portion of a calendar that brings new events into view, when a calendar view is launched, or for some other reason. In addition, multiple events may be rendered, not just a single event.

For each event that is identified, the event is analyzed to determine whether or not it qualifies for warping (step 1003). A period of time may already have been identified within which to warp events. Thus, determining whether or not a particular event qualifies includes evaluating if the event falls within the period of time. If not, then a non-warped time for the event is identified (step 1005), which may include ascertaining a time scheduled for the event and then translating the time to a time in the active time zone associated with a calendar view. For instance, the event may be stored with its time given in Coordinated Universal Time (UTC), in which case the time would be translated to MST or some other active time zone.

If the event does qualify for warping, then a warped time is identified for the event (step 1007). The time may be stored in some time zone or other time format, such as UTS or GMT, in which case the time the event will occur in its scheduled time zone is determined. For example, if the event is scheduled to occur in the Pacific time zone, then the time at which it will occur in terms of the Pacific Standard Time is determined. That time, the time at which the event will experienced when it occurs, is the warped time, at least from the perspective of an active time zone (e.g. MST) that differs from scheduled time zone.

Next, a location in a calendar grid is identified based on either the warped time or non-warped time that is determined (step 1009). This may include, for example, identifying a vertical location in a weekly grid that corresponds to a time in a time range for the event. In a weekly grid, a horizontal location in the grid may correspond to the day that the event is scheduled for. Once the location in a grid is identified, the event may be rendered in the grid (step 1011).

Referring back to FIG. 3, computing system 301 may be implemented as a single apparatus, system, or device or may be implemented in a distributed manner as multiple apparatuses, systems, or devices. Computing system 301 includes, but is not limited to, processing system 302, storage system 303, calendar software 305, communication interface system 307, and user interface system 309. Processing system 302 is operatively coupled with storage system 303, communication interface system 307, and user interface system 309.

Processing system 302 loads and executes calendar software 305 from storage system 303. When executed by processing system 302 to implement enhanced event presentation, calendar software 305 directs processing system 302 to operate as described herein for the various processes, operational scenarios, and sequences discussed in the foregoing implementations of calendar views. Computing system 301 may optionally include additional devices, features, or functionality not discussed for purposes of brevity.

Referring still to FIG. 3, processing system 302 may comprise a microprocessor and other circuitry that retrieves and executes calendar software 305 from storage system 303. Processing system 302 may be implemented within a single processing device but may also be distributed across multiple processing devices or sub-systems that cooperate in executing program instructions. Examples of processing system 302 include general-purpose central processing units, application specific processors, and logic devices, as well as any other type of processing device, combinations, or variations thereof Storage system 303 may comprise any computer readable storage media readable by processing system 302 and capable of storing calendar software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 303 may also include computer readable communication media over which calendar software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 302 or possibly other systems.

Calendar software 305 may be implemented in program instructions and among other functions may, when executed by processing system 302, direct processing system 302 to operate as described with respect to the various operational scenarios, sequences, and processes illustrated herein. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Other software processes, programs, or components in addition to calendar software 305 may be stored in storage system 303 and executed by processing system 302, such as operating system software or other application software. Calendar software 305 may also comprise firmware or some other form of machine-readable processing instructions executable by processing system 302.

In general, calendar software 305 may, when loaded into processing system 302 and executed, transform a suitable apparatus, system, or device (of which computing system 301 is representative) overall from a general-purpose computing system into a special-purpose computing system customized to facilitate enhanced event presentation as described herein for each implementation. Indeed, encoding calendar software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer readable storage media are implemented as semiconductor-based memory, calendar software 305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIG. 1 as an example, through the operation of a computing system or systems of which computing system 301 is representative, transformations may be performed with respect to calendar view 100. As an example, an event may be scheduled in a time zone other than an active time zone. When a user navigates within calendar view 100 and encounters a period of time within which events are warped, the event is rendered at a time that reflects how it will be experienced, rather than a time that reflects its actual scheduled time, thereby changing the state of calendar view 100. Referring to FIG. 4A and FIG. 4B, a transformation may occur by toggling back and forth between a warp-enabled state and a non-warped state.

It may be understood that computing system 301 is generally intended to represent a computing system or systems on which calendar software 305 may be deployed and executed in order to implement enhanced event presentation. However, computing system 301 may also be suitable as any computing system on which calendar software 305 may be staged and from where one or both may be distributed, transported, downloaded, or otherwise provided to yet another computing system for deployment and execution, or yet additional distribution.

Communication interface system 307 may include communication connections and devices that allow for communication with other computing systems (not shown) over a communication network or networks. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 309 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may also include associated user interface software executable by processing system 302 in support of the various user input and output devices discussed above. Separately or in conjunction with each other and other hardware and software elements, the user interface software and user interface devices may support a graphical user interface, a natural user interface, or any other type of user interface. For example, calendar view 100, calendar view 400, and calendar view 600 may be presented through user interface system 309. In addition, user input made with respect to the user interfaces can be input via user interface system 309.

Communication between computing system 301, and any other computing system occurs over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTMLS, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of presenting calendars to facilitate enhanced event presentation across time zones, the method comprising:

identifying in a calendar set to an active time zone, at least a period of time within which to display a warped presentation of events scheduled to occur outside of the active time zone; and for at least an event scheduled to occur outside of the active time zone at a time in a different time zone that falls within the period of time, presenting the event in the calendar as if the event were scheduled for that time but in the active time zone, wherein identifying at least the period of time comprises identifying a warping event, identifying a start time and an end time for the warping event, and identifying the period of time based at least in part on the start time and the end time for the warping event, wherein the warping event comprises travel and wherein the method further comprises, when scheduling the travel, presenting a warp option selectable to at least enable the warped presentation of the events scheduled to occur outside of the active time zone, wherein the calendar comprises a warped region associated with the warped presentation of the events scheduled to occur outside of the active time zone and a non-warped region associated with a non-warped presentation of non-warped events scheduled to occur in the active time zone, wherein the warped presentation comprises a visual characteristic that distinguishes the warped region from the non-warped region, wherein the visual characteristic comprises a different fill pattern relative to the non-warped region, wherein the calendar comprises a weekly grid defined by a plurality of days and a single range of times in the active time zone.

2. The method of claim 1 wherein the warping event comprises a meeting scheduled to occur outside of the active time zone and wherein the method further comprises, when scheduling the meeting, presenting a warp option selectable to enable the warped presentation of the events scheduled to occur outside of the active time zone.

3. An apparatus comprising:

one or more non-transitory computer readable storage media; and program instructions stored on the one or more non-transitory computer readable media to facilitate enhanced event presentation in calendars that, when executed by a processing system, direct the processing system to at least:

identify in a calendar set to an active time zone, at least a period of time within which to display a warped presentation of events scheduled to occur outside of the active time zone;

for at least an event scheduled to occur outside of the active time zone at a time in a different time zone that falls within the period of time, render the event in the calendar as if the event were scheduled for that time but in the active time zone, wherein, to identify at least the period of time, the program instructions direct the processing system to identify a warping event, identify a start time and an end time for the warping event, and identify the period of time based at least in part on the start time and the end time for the warping event, wherein the warping event comprises travel and wherein the program instructions further direct the processing system to, when scheduling the travel, render a warp option selectable to at least enable the warped presentation of the events scheduled to occur outside of the active time zone, wherein the calendar comprises a warped region associated with the warped presentation of the events scheduled to occur outside of the active time zone and a non-warped region associated with a non-warped presentation of non-warped events scheduled to occur in the active time zone, wherein the warped presentation comprises a visual characteristic that distinguishes the warped region from the non-warped region, wherein the visual characteristic comprises a different fill pattern relative to the non-warped region, wherein the calendar comprises a weekly grid defined by a plurality of days and a single range of times in the active time zone.

4. The apparatus of claim 3 wherein the warping event comprises a meeting scheduled to occur outside of the active time zone and wherein the program instructions further direct the processing system to, when scheduling the meeting, render a warp option selectable to enable the warped presentation of the events scheduled to occur outside of the active time zone.

5. The apparatus of claim 3 further comprising the processing system configured to read and execute the program instructions.

6. A method of warping calendar presentations comprising:

rendering a view of a calendar comprising a range of times;

identifying at least a period of time in the calendar within which to display a warped presentation of events scheduled to occur outside of an active time zone;

for a non-warped event scheduled to occur on a day and at a time in the active time zone that falls outside of the period of time, rendering the non-warped event in the view of the calendar to correspond to a representation of that time in the range of times;

for at least a warping event scheduled to occur within the period of time and on a different day at that time, but in a different time zone, rendering the warping event in the view of the calendar to correspond to the representation of that time in the range of times, wherein identifying at least the period of time comprises identifying a start time and an end time for the warping event and identifying the period of time based at least in part on the start time and the end time for the warping event, wherein the warping event comprises travel and wherein the method further comprises, when scheduling the travel, presenting a warp option selectable to at least enable the warped presentation of the events scheduled to occur outside of the active time zone, wherein the calendar comprises a warped region that is associated with the warped presentation of the events scheduled to occur outside of the active time zone and that is visually distinguished from a non-warped region associated with a non-warped presentation of non-warped events scheduled to occur in the active time zone, wherein the visual characteristic comprises a different fill pattern relative to the non-warped region, wherein the calendar comprises a weekly grid defined by a plurality of days and a single range of times in the active time zone.

* * * * *